United States Patent

Jablonski

[11] Patent Number: 5,860,564
[45] Date of Patent: Jan. 19, 1999

[54] ICE DISPENSING CHUTE

[75] Inventor: Ted Jablonski, Palatine, Ill.

[73] Assignee: IMI Cornelius Inc., Anoka, Minn.

[21] Appl. No.: 707,831

[22] Filed: Sep. 6, 1996

Related U.S. Application Data

[60] Provisional application No. 60/003,350 Sep. 7, 1995.

[51] Int. Cl.⁶ .................................. B65B 1/04; F25C 5/00
[52] U.S. Cl. .......................... 221/303; 221/311; 141/362; 62/344
[58] Field of Search .................................... 141/198, 351, 141/360, 362, 352, 361; 62/344; 222/185.1; 221/303, 311

[56] References Cited

U.S. PATENT DOCUMENTS

| | | | |
|---|---|---|---|
| 4,102,660 | 7/1978 | Beckett et al. | 221/311 |
| 5,139,183 | 8/1992 | Buchser et al. | 222/547 |
| 5,272,888 | 12/1993 | Fisher et al. | 62/344 |
| 5,437,391 | 8/1995 | Landers et al. | 222/1 |

FOREIGN PATENT DOCUMENTS 2710633  10/1977  Germany ................................ 141/362

*Primary Examiner*—Karen M. Young
*Assistant Examiner*—Thuy V. Tran
*Attorney, Agent, or Firm*—Sten Erik Hakanson

[57] ABSTRACT

The present invention comprises an ice directing chute mechanism including a slide portion and a housing portion. The slide portion is securable to an ice dispensing machine. In particular, the slide is securable to a regulated opening of the dispenser. The regulated opening includes a door means that is operable between a closed and open position by an operating mechanism such as, a solenoid. The solenoid is activated by a switch electrically connected thereto whereby contacting of the switch results in operating the solenoid to open the door. The door is positioned between an ice retaining bin of the dispenser and the slide portion. A housing portion is releasably secured to and pivotally suspended from the slide portion. Together, the slide and housing portions define an ice channel ending with a downward directed dispense orifice. The housing portion includes a surface portion thereof for contacting the switch that operates the solenoid.

6 Claims, 5 Drawing Sheets

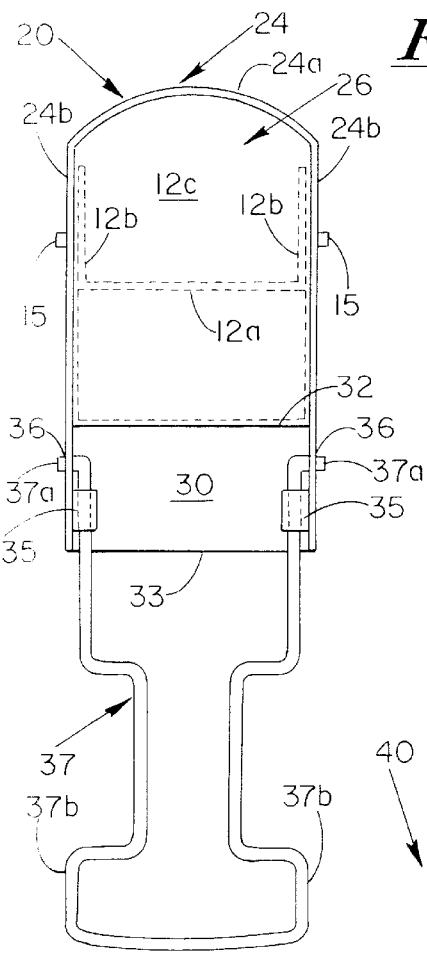
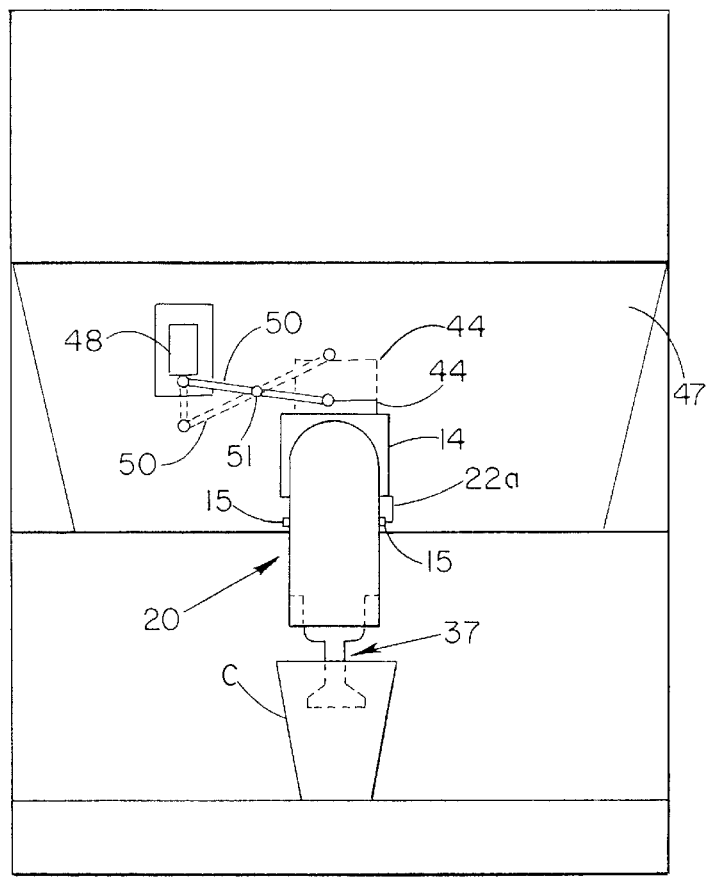

ICE DISPENSING CHUTE

This is a nonprovisional application based on copending provisional application serial no. 60/003,350, filed Sep. 7, 1995.

FIELD OF THE INVENTION

The present invention relates generally to ice dispensing mechanisms, and in particular to ice dispensing chutes.

BACKGROUND OF THE INVENTION

Ice dispensing machines that include mechanisms for dispensing ice into a suitable receptacle are well known in the art. Such mechanisms typically include a solenoid operated door for regulating the flow of ice from an ice retaining bin area. When open, the door permits the ice to flow under the force of gravity from the bin area into a chute that directs the ice into a cup or the like. In one known embodiment, a dispense switch for operating the solenoid is activated by the movement of a lever arm, which arm is operated by the cup being placed and held against it. In another embodiment, the user positions the cup beneath the chute with one hand while depressing the dispense switch with the other. A drawback with prior art embodiments of the first type concerns the general complexity of the chute and lever mechanism. Such complexity, in terms of parts and difficulty of servicing increases the purchase price and the overall cost of operation of such a dispenser. It can also be appreciated that in such a prior art embodiment, the cup or other receptacle can move out of ideal alignment with the dispensing end opening of the stationary dispensing chute when moved against the separate activating lever. Specifically, the rim of the cup or receptacle can become less centered below the dispensing opening with the result that the dispensed ice will have a much greater tendency to fall outside the cup or other receptacle being filled and become waste. Ice that is wasted represents, over time, a significant inefficiency in terms of energy loss.

The second embodiment is less desirable from an ease of use and also an energy efficiency standpoint. From a use point of view, it is less desirable to be required to use both hands. Also, there exists a tendency for the cup to be less accurately positioned under the chute when part of the user's concentration is being diverted to operation of the switch. This situation also results in more spillage of ice, and hence, a wasting of the energy used to make that spilled ice. Also, in the second embodiment, there is a greater likelihood, as opposed to a lever arm operated dispenser, that a user will operate the dispense switch before positioning a cup under the chute very accurately. And in some instances will depress the switch without a cup being positioned under the chute at all. These situation occur more frequently because the operation of the switch is independent of placing the cup against the lever. Accordingly, it would be desirable to have an ice maker dispense mechanism that is simple in terms of the number of parts and that minimizes the occurrence of ice wastage.

SUMMARY OF THE INVENTION

The present invention comprises an ice directing chute mechanism including a slide portion and a housing portion. The slide portion is securable to an ice dispensing machine. In particular, the slide is securable to a regulated opening of the dispenser. The regulated opening includes a door means that is operable between a closed and open position by an operating mechanism such as, a solenoid. The solenoid is activated by a switch electrically connected thereto whereby contacting of the switch results in operating the solenoid to open the door. The door is positioned between an ice retaining bin of the dispenser and the slide portion. A housing portion is releasably secured to and pivotally suspended from the slide portion. Together, the slide and housing portions define an ice channel ending with a downward directed dispense orifice. The housing portion includes a surface portion thereof for contacting the switch that operates the solenoid.

In operation, a cup or other suitable receptacle to be filled with a quantity of ice is moved against a cup contact area of the housing portion so that the housing is moved against and contacts the switch. As a result thereof, the door is opened by operation of the solenoid whereby ice, located in the ice retaining bin, can flow under the force of gravity into the ice directing channel. The ice directing channel then directs the ice to the dispense orifice where it can fall into the cup or other receptacle being filled. The housing cup contact area is positioned and designed so that when the cup is pressed against it, the cup is generally centered below the discharge orifice. Since the housing portion moves with the cup as the cup is pressed against it, the desired ideal alignment between the cup and the discharge orifice is maintained. Thus, the dispensed ice always has the best chance of falling into the cup as opposed to falling outside the cup as waste. Moreover, it is much more unlikely that the housing will be moved to cause dispensing when a cup or other receptacle is not positioned below the dispense orifice.

DESCRIPTION OF THE DRAWINGS

A better understanding of the structure, function and the objects and advantages of the present invention can be had by reference to the following detailed description which refers to the following figures, wherein:

FIG. 5 shows a cross-sectional view along lines 5—5 of FIG. 1.

FIG. 6 shows a front plan view of the present invention as secured to an ice dispensing machine.

DETAILED DESCRIPTION

Figure 1:
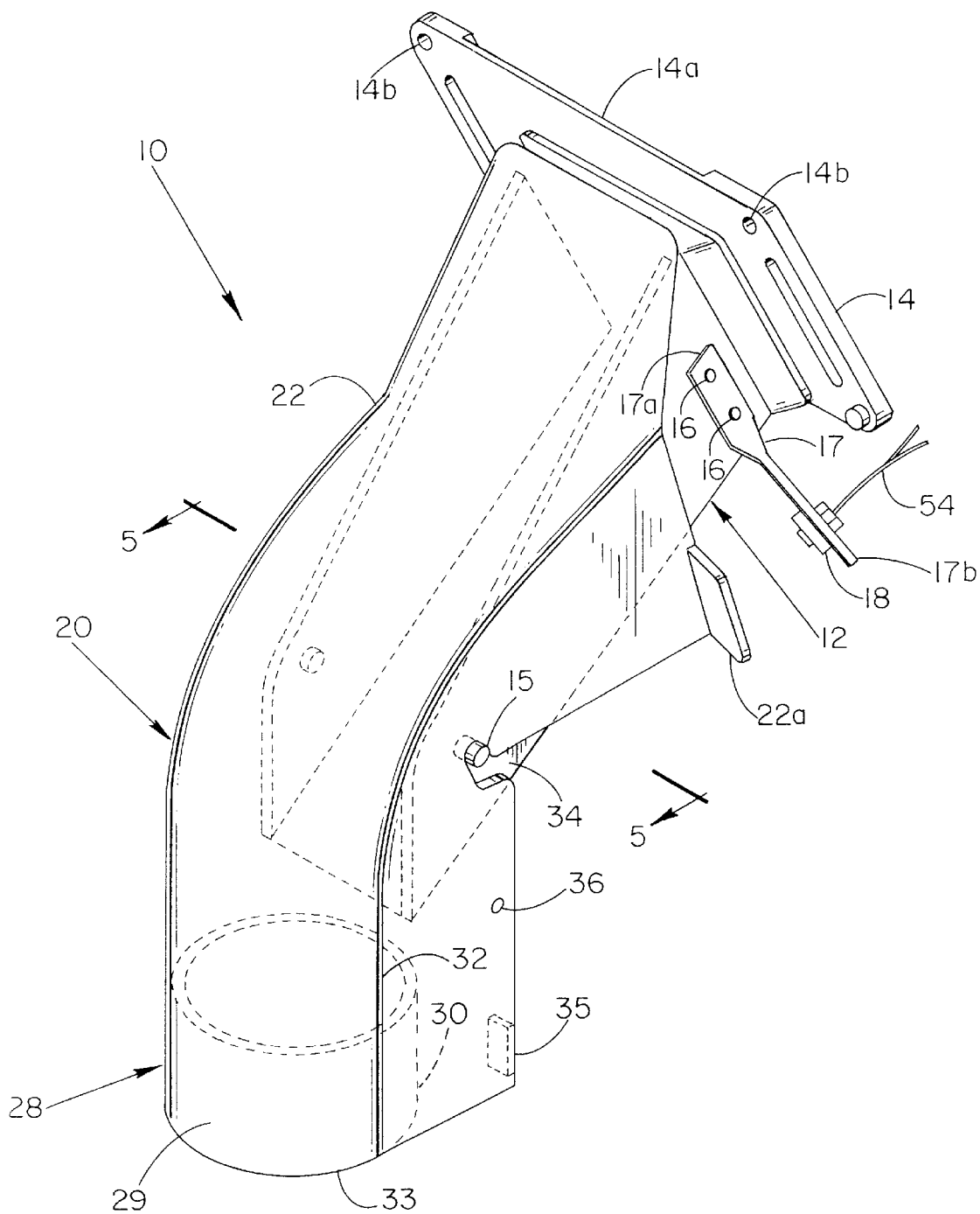
FIG. 1. shows a perspective view of the present invention.
Figure 2:
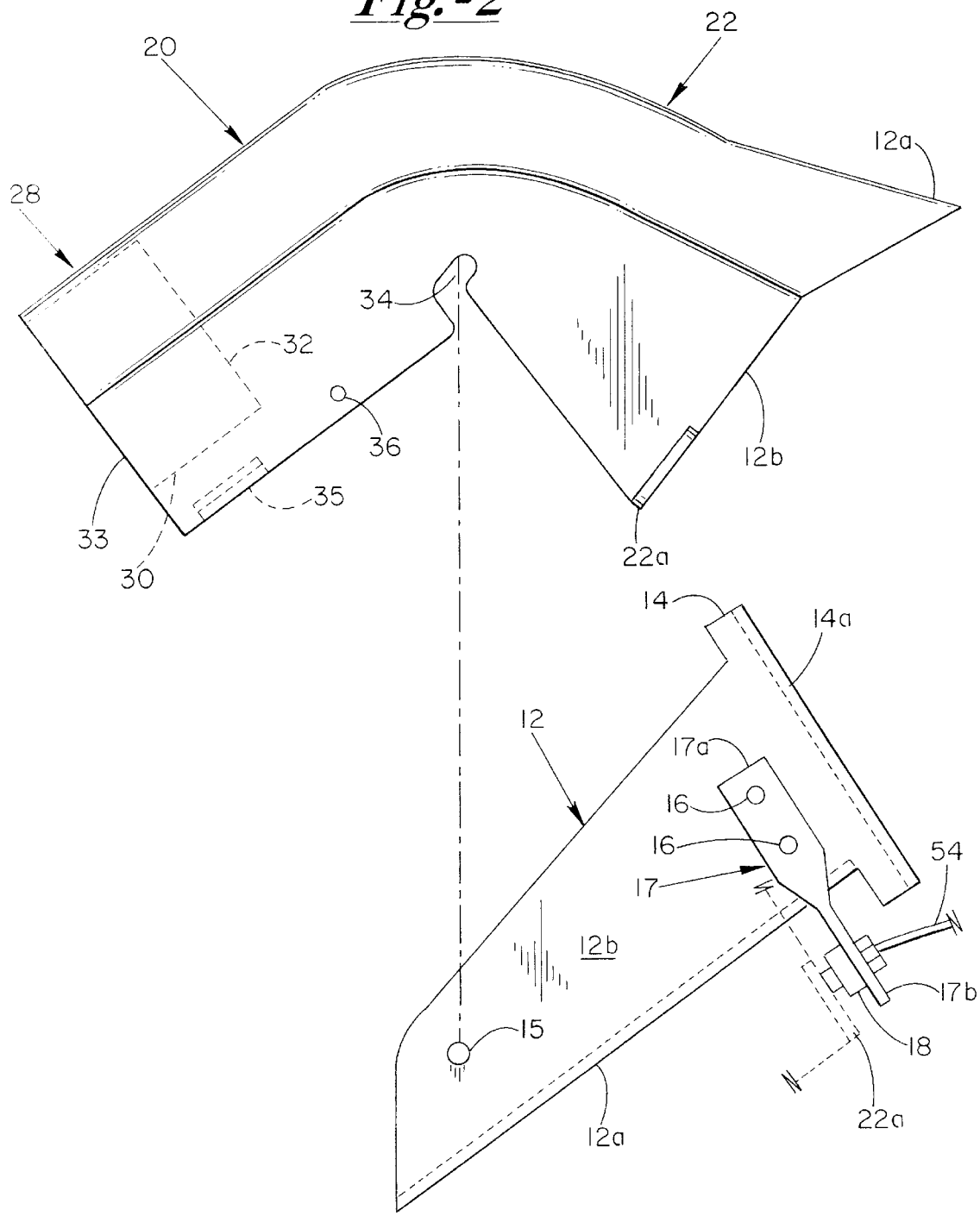
FIG. 2. shows a side plan view of the present invention.

The ice dispensing chute of the present invention is seen in the various figures and indicated by the numeral 10. Chute 10 includes an inclined slide portion 12 having an integral flange portion 14. Flange 14 includes an ice door receiving recessed area 14*a* and a plurality of screw receiving holes 14*b*. Slide 12 includes a bottom surface portion 12*a* and a pair of sidewalls 12*b* integral with bottom surface 12*a* and extending upward therefrom. Bottom 12*a* and sides 12*b* serve to define an ice flow trough area 12*c*. Slide 12 includes a pair of pins 15 integral with and extending from sides 12*b* as well as a pair of mounting bosses 16 extending from one of sides 12*b*. A flange 17 includes an upper portion 17*a* for securing to bosses 16 and a lower portion 17*b* extending in a plane transverse to upper portion 17*a*. Lower portion 17*b* serves to position and retain a switch 18.

Chute 10 also includes a removable ice directing housing 20. Housing 20 includes an upper portion 22 defined by a surface 24. As seen by also referring to FIG. 5, surface 24 is U-shaped having an arcuate top surface portion 24a and two sidewall surface portions 24b. Surface 24 serves to define an open slide receiving area 26. Housing 20 also includes a lower portion 28 that, as opposed to upper portion 22, includes a closed tube section 29 defined by a perimeter surface 30. Surface 30 serves to define an upper opening 32 and a lower ice dispensing orifice 33. Upper portion 22 also includes a switch activation tab 22a integral with and extending therefrom for contacting switch 18.

Housing 20 is arcuate in its external shape wherein upper portion 22 and lower portion 28 extend in a manner transverse to each other. Sides 24b each define L-shaped pin receiving notches 34 located therein at a position thereon approximately at the juncture of upper portion 22 and lower portion 28. Housing 20 also includes a pair of retaining tabs 35 and a pair of wire retaining holes 36. A lever arm 37 is formed of wire includes ends 37a for insertion into holes 36 so that arm 37 is releasably secured to housing 20 and depends downward therefrom. Arm 37 also includes a pair of curved wing portions 37b for cradling a cup or other object pushed against arm 37.

As is understood in the art, a dispensing machine 40 includes an ice retaining bin area 41 where ice 42 is retained. A door 44 is slideably engaged to dispenser 14 and positioned to cover an opening 46 located in a front surface 47 of dispenser 14. Specifically, flange 14 is secured to surface 47 at and around opening 46 so that door 44 can slide within door receiving area 14a. As is also understood by those of skill, door 44 is moveable to alternately cover and uncover opening 46 by an opening and closing means such as a solenoid operated mechanism. Such mechanisms, for example, can include a solenoid 48 and a connecting means between solenoid 48 and door 44, such as a rod 50 pivotally secured to solenoid 48, door 44 and a pivot point 51. Switch 18 is connected to solenoid 48 by wires 54 for controlling the operation thereof.

Figure 3:
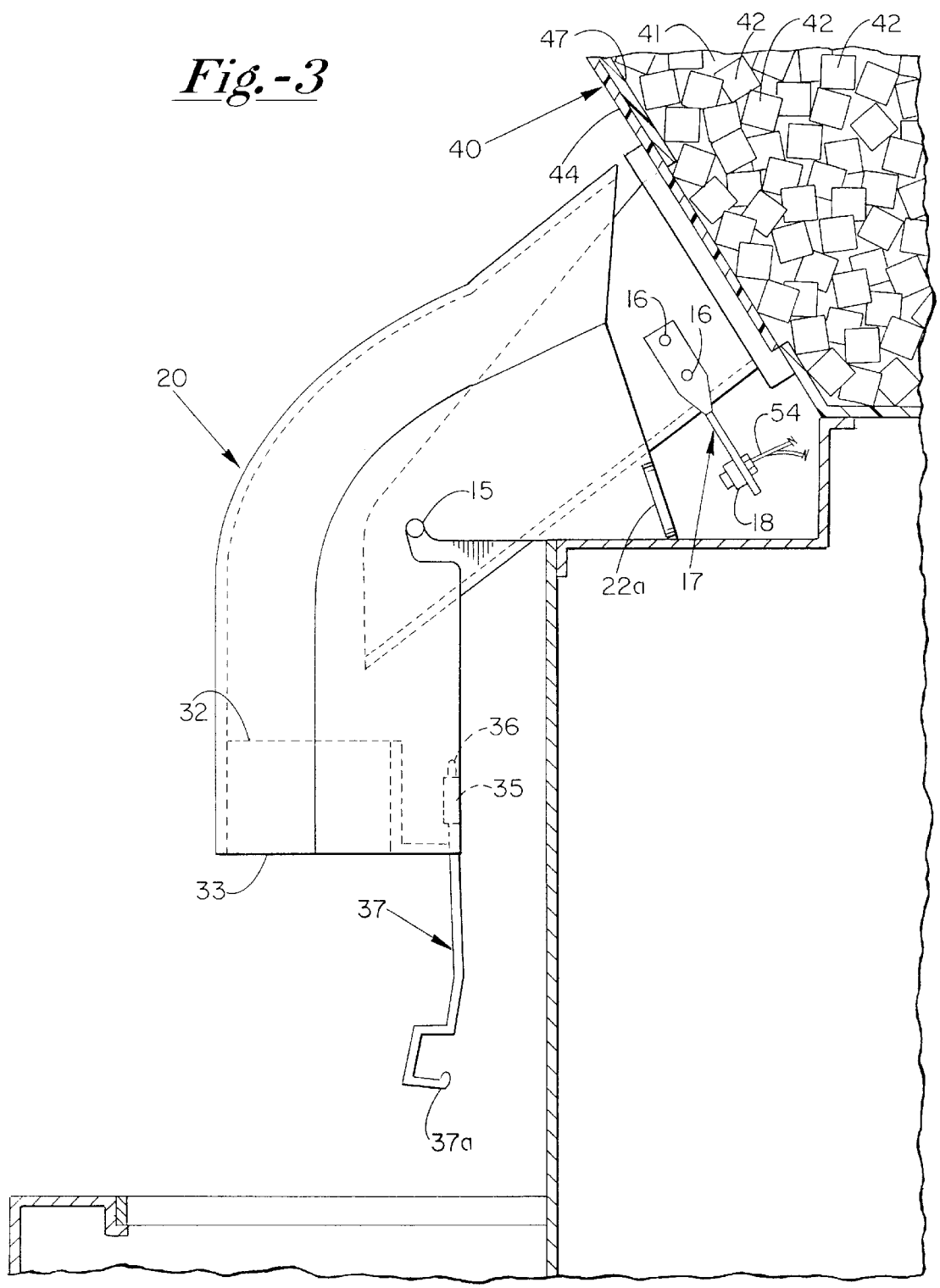
FIG. 3. Shows a side plan view of the present invention in the context of an ice dispensing machine FIG. 4. shows a further side plan view of the present invention in the context of an ice dispensing machine.
Figure 4:
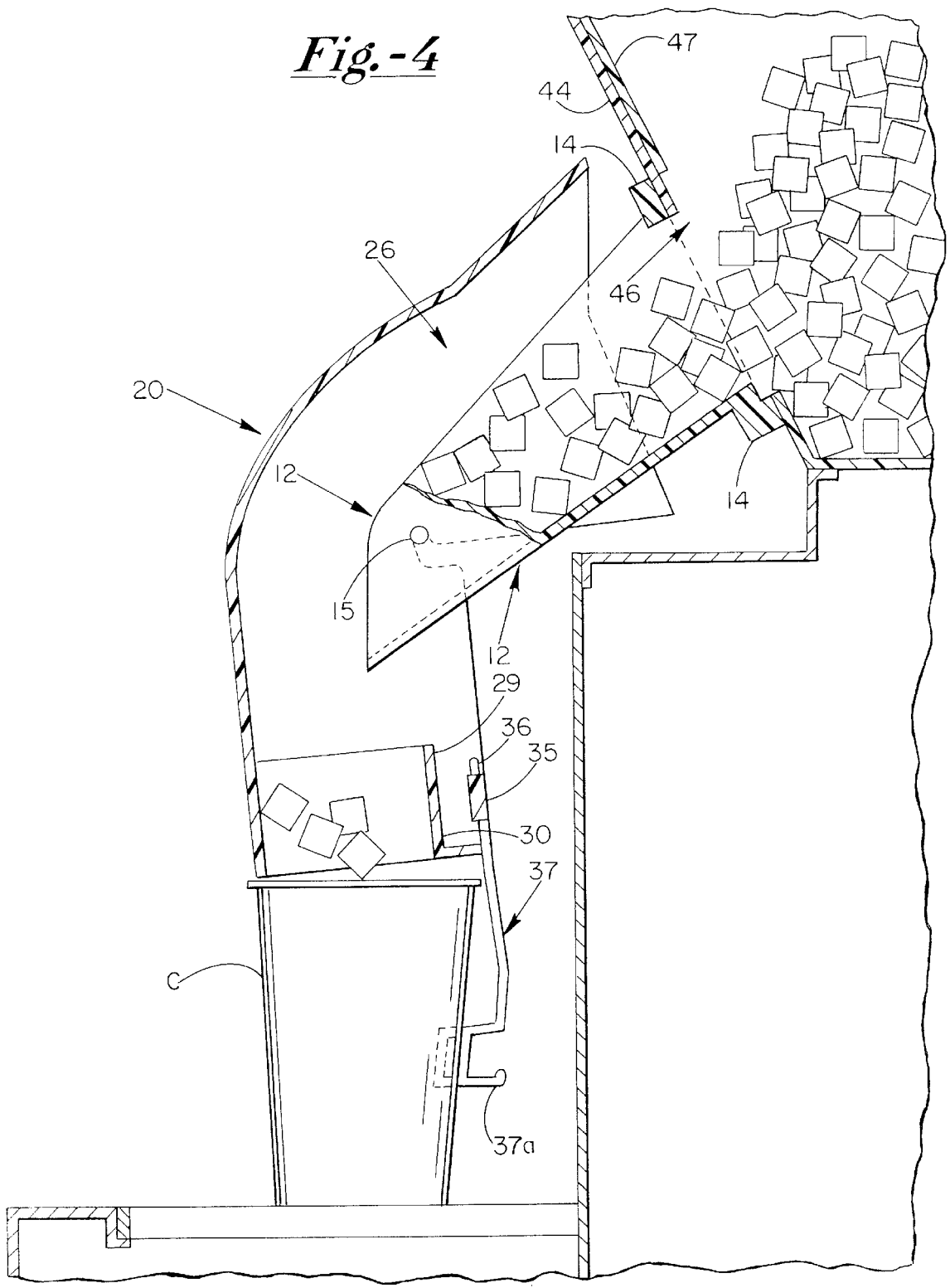

In operation, housing 20 is releasably secured to slide 12 wherein pins 15 are received within L-shaped notches 34. Housing 20 is then suspended on slide 12 wherein slide 12 is received within area 26 whereby surface 24 and slide 12 form an enclosed ice guiding area being essentially the combination of areas 12c and 26. Arm 37 is then secured to housing 20 whereby ends 37a thereof inserted into holes 36 by squeezing ends 37a closer together, inserting them into holes 36 and then releasing the squeezing action wherein spring tension of wire arm 37 holds it in place. Tabs 35 serve to further retain arm 37 in place. Also, with arm 37 secured to housing 20, housing 20 is held in place on slide 12, i.e. arm 20 must first be removed to remove housing 20 from slide 12. Housing 20 is then free to pivot about pins 15 in an arcuate manner between a first position seen in FIG. 3 and a second position seen in FIG. 4. As also seen in FIG. 4, a cup, indicated by the letter C, can be pressed against arm 37 moving housing 20 to the second position. It will be appreciated that tab 22a will then contacts switch 18 positioned and held by flange 17. Switch 18 then signals solenoid 48 to move rod 50 thereby opening door 44. Ice 42 then flows under the force of gravity from bin 40 into the ice receiving or guiding area 26. The ice 42 then slides into tube section 29 and guided thereby out of lower dispense orifice 33 and ultimately into cup C. It can be appreciated that the combination of slide 12 and housing 20 serve to define an ice flow channel extending from door 44 to orifice 33.

It will be appreciated by those of skill that the present invention is simple in terms of number of parts, there being essentially slide 12, housing 20 and arm 37. Additionally, housing 20 can be quickly and easily secured to or removed from slide 12 in a manner that does not require any tools. This ability greatly facilitates any servicing, for example of door 44 or its operating mechanism. Furthermore, by having housing 20 activate the switch that initiates ice dispensing, the ice dispensing orifice 33 naturally follows the cup or other receptacle pressing against arm 37 Such centering ability is enhanced by the cradling effect of wings portions 37b. Thus, the cup is generally continually centered in the desired manner below discharge orifice 33 as ice is dispensed therefrom. As a result thereof, the ice will have a much greater tendency to fall into the cup as opposed to falling and missing the interior thereof, or contacting the rim thereof and being deflected so as to also miss the cup interior. Thus the present invention wastes less ice than dispensing chutes seen in the prior art where the ice directing chute mechanism thereof is stationary and a separate lever mechanism is used to initiate ice dispensing, or where operation of the ice dispensing switch is not at all related to cup position.

What is claimed is:

1. An ice chute for use with ice dispensing equipment having a regulated opening including a door operated by a door opening and closing mechanism where the door opening and closing mechanism is operated by a switch means, the ice chute, comprising:

a slide portion for securing to the ice dispenser around the regulated opening thereof and a housing portion for releasable securing to the slide portion whereby the housing portion is movably suspended therefrom for moving between a first position and a second position and whereby the housing portion and the slide portion together define a substantially enclosed ice directing channel having an opening at the regulated ice dispenser opening and terminating with an ice dispensing orifice for directing ice into a receptacle positioned there below, and the housing portion including a switch contacting portion for contacting the switch means when the housing portion is moved to the second position by movement of the receptacle against a receptacle contacting portion of the housing portion for initiating dispensing of ice into the receptacle.

2. The ice dispensing chute as defined in claim 1, and the slide portion having a bottom surface portion and two sidewalls integral with and extending transversely and upward from and along opposite sides edges of the bottom surface defining an ice trough area and the housing portion having a U-shaped outer surface and the housing portion extending through an arc for directing ice moving through the trough area into a downward direction for dispensing into the receptacle and the housing portion pivotally suspended from the slide portion sidewalls.

3. The ice dispensing chute as defined in claim 2 and the housing portion U-shaped outer surface defined by a curved portion and two flat walls integral therewith and extending therefrom where the sidewalls of the slide portion fit within and lie directly adjacent the U-shaped outer surface flat walls.

4. The ice dispensing chute as defined in claim 3 and the receptacle contacting portion secured to and depending from the housing portion at the ice dispensing orifice.

5. The ice dispensing chute as defined in claim 2 and the receptacle contacting portion secured to and depending from the housing portion at the ice dispensing orifice.

6. The ice dispensing chute as defined in claim 1 and the receptacle contacting portion secured to and depending from the housing portion at the ice dispensing orifice.

* * * * *